United States Patent [19]
Endo et al.

[11] Patent Number: 5,499,566
[45] Date of Patent: Mar. 19, 1996

[54] FOLLOW-UP SLOTTING TOOL

[75] Inventors: Shigeru Endo; Fumitaka Sugizaki, both of Isehara, Japan

[73] Assignee: Amada Metrecs Company, Limited, Isehara, Japan

[21] Appl. No.: 292,008

[22] Filed: Aug. 17, 1994

[30]   Foreign Application Priority Data

Aug. 17, 1993   [JP]   Japan ................... 5-203251

[51] Int. Cl.⁶ ..................................................... B26D 5/08
[52] U.S. Cl. ................... 83/636; 83/49; 83/684; 83/689; 83/693; 83/916
[58] Field of Search ............................. 83/916, 917, 682, 83/684, 685, 687, 692, 693, 49, 56, 636, 689

[56]          References Cited

U.S. PATENT DOCUMENTS

| 3,938,413 | 2/1976 | Goettel, et al. ............... 83/145 |
| 4,545,272 | 10/1985 | Herb ......................... 83/165 |
| 4,914,996 | 4/1990 | Lavorel ...................... 83/151 |
| 4,981,058 | 1/1991 | Gavrum, III .................. 83/34 |
| 5,195,413 | 3/1993 | Johnson . |
| 5,400,682 | 3/1995 | Matsuura ..................... 83/49 |

FOREIGN PATENT DOCUMENTS

| 7334307 | 3/1974 | Germany . |
| 61-154721 | 7/1986 | Japan . |
| 62-263830 | 11/1987 | Japan . |
| 2-76621 | 6/1990 | Japan . |
| 4-16248 | 3/1992 | Japan . |
| 2197814 | 6/1988 | United Kingdom . |

OTHER PUBLICATIONS

European Search Report dated Nov. 21, 1994.

*Primary Examiner*—Kenneth E. Peterson
*Assistant Examiner*—Elizabeth Stanley
*Attorney, Agent, or Firm*—Wigman, Cohen, Leitner & Myers

[57]          ABSTRACT

In a follow-up slotting tool for continuously punching workpiece (W) fed between a punch (3) and a die unit (5) at a predetermined pitch, the punch (3) is formed with a shear angle ($\alpha$) at a lower end surface thereof in such a way that a front end of the punch is cut into the workpiece but a rear end thereof is not cut into the workpiece when lowered at a predetermined downward stroke; and the die unit (5) is provided with a counter member (15) for raising a residue ($W_A$) partially cut away from the workpiece, after the punch has been lowered at the predetermined downward stroke, and with a cutting edge (21) for cutting off the partially cutaway residue ($W_A$) raised by the counter member in cooperation with the punch, when the punch is lowered at the succeeding predetermined downward stroke. The follow-up die can form an elongate slot, without forming any stepped portions at the junction portions of the workpiece, in spite of a relatively large pitch of the follow-up cutting processing of workpiece W.

6 Claims, 4 Drawing Sheets

FOLLOW-UP SLOTTING TOOL

BACKGROUND OF THE INVENTION

1. Field of the Invention

The present Invention relates to a follow-up slotting tool suitable for use to form an elongate slot, for instance by punching off workpiece continuously and repeatedly by feeding plate material by a predetermine pitch. Here, the follow-up implies that a plurality of residues (punched-off parts of workpiece) are each cut partially and then completely away from workpiece continuously to form an elongate slot, without forming any stepped portions at the junction portions in the punched-off plate material.

2. Description of the Related Art

As the conventional follow-up slotting tools for continuously punching off workpiece located and shifted between a punch and a die to form an elongate slot, for instance, there have been so far known an elongated rectangular punch and a slotting tool (as disclosed in Japanese Published Unexamined Utility Model Application (Kokai) No. 2-76621). In the case of the conventional elongated rectangular punch, however, since stepped (non-straight) portions are inevitably formed at the junction (overlap-punched) portions of the punched-off workpiece, whenever excellent external appearance is required for the punched-off products, it has been so far necessary of finish or eliminate the formed stepped portions with the use of a file, for instance.

Further, in the case of the conventional slotting tool, although no stepped portions are formed, since the slotting tool is provided with vertically movably tip and pin and a cam mechanism for driving the tip and pin, there exist problems in that the die mechanism is complicated; work feed pitch is small; and a long processing time is required. In addition, since there exists a limit of the cutting length punched off by the slotting tool, another problem arises in that the junction portions are inevitably formed at several positions of the workpiece in the case where a relatively long slot is required to be formed.

SUMMARY OF THE INVENTION

With these problems in mind, therefore, it is the primary object of the present invention to provide a follow-up slotting tool which can punch off workpiece repeatedly and continuously to form an elongate slot for instance, without forming any stepped portions in the junction portions in the punched-off workpiece, in spite of a relatively large workpiece feeding pitch.

To achieve the above-mentioned object, the present invention provides a follow-up slotting tool for continuously punching workpiece fed between a punch and a die unit at a predetermined pitch, wherein the punch is formed with a shear angle at a lower end surface thereof in such a way that a front end of the punch is cut into the workpiece but a rear end thereof is not cut into the workpiece when lowered at a predetermined downward stroke; and the die unit is provided with a counter member for raising a residue partially cut away from the workpiece, after the punch has been lowered at the predetermined downward stroke, and with a cutting edge for cutting off the partially cut away residue raised by the counter member in cooperation with the punch, when the punch is lowered at the succeeding predetermined downward stroke.

Further, the present invention provides a follow-up slotting tool for continuously punching workpiece fed at a predetermined pitch, which comprises: a punch formed with a shear angle at an end surface thereof in such a way that a front end of the punch is cut into the workpiece but the rear end thereof is not cut into the workpiece when lowered at a predetermined downward stroke; and a die unit having: a die plate formed with a die opening; an upper die plate arranged under said die plate and formed with a rectangular opening corresponding to the die opening and with first and second openings both extending perpendicular to the rectangular opening; a counter member loosely fitted to the first opening of said upper die plate, for raising a residue partially cut away from the workpiece, after said punch has been lowered at the predetermined downward stroke; and a cutting edge fixedly fitted to the second opening of said upper die plate, for cutting away the partially cut away residue raised by said counter member in cooperation with said punch, when said punch is lowered at the succeeding predetermined downward stroke.

Further, the follow-up slotting tool further comprises at least one spring for urging said counter member to raise the partially cut away residue so that the residue can be cut off from the workpiece at the succeeding predetermined downward stroke. The follow-up slotting tool further comprises a lower die plate for fixing both said counter member and said cutting edge between said upper die plate and said lower die plate, respectively.

Further, the punch is lowered to another predetermined downward stroke to cut off the final partially cut away residue from the workpiece by the rear end of said punch to complete a slot in the workpiece by continuous punching processing. Further, the predetermined pitch is less than an already partially cut away workpiece length.

In the follow-up slotting tool according to the present invention, a front end surface of workpiece is first mounted at roughly a central portion of a die, and then a punch is lowered for first partial (U-shaped) cutaway processing. In this cutting processing, the punch is lowered at such a stroke that a front end side of the punch is cut into the workpiece but a rear end side of the punch is not cut into the workpiece. After this partial cutting process, a residue (a portion partially cut away from the workpiece by the front end side of the punch) is lifted up by a counter member provided for the die by an elastic force of springs.

After that, the workpiece is fed by a predetermined pitch less than an already partially cut away workpiece length, and then the punch is lowered again to completely cut off the partially cut away residue. By this cutting processing, the residue is cut off completely from the workpiece by the front end surface of the punch in cooperation with the cutting edge of the die.

The above-mentioned partial cutting operation is repeated until the punched-off opening reaches a predetermined final cut-off length, and then the press stroke is set large at the final punch to such an extent that the rear end side of the punch can be cut into the workpiece to cut off the final residue from the workpiece to form an elongate slot in the workpiece.

DETAILED DESCRIPTION OF THE EMBODIMENTS

An embodiment of the follow-up slotting tool according to the present invention will be described hereinbelow with reference to the attached drawings.

Figure 1:
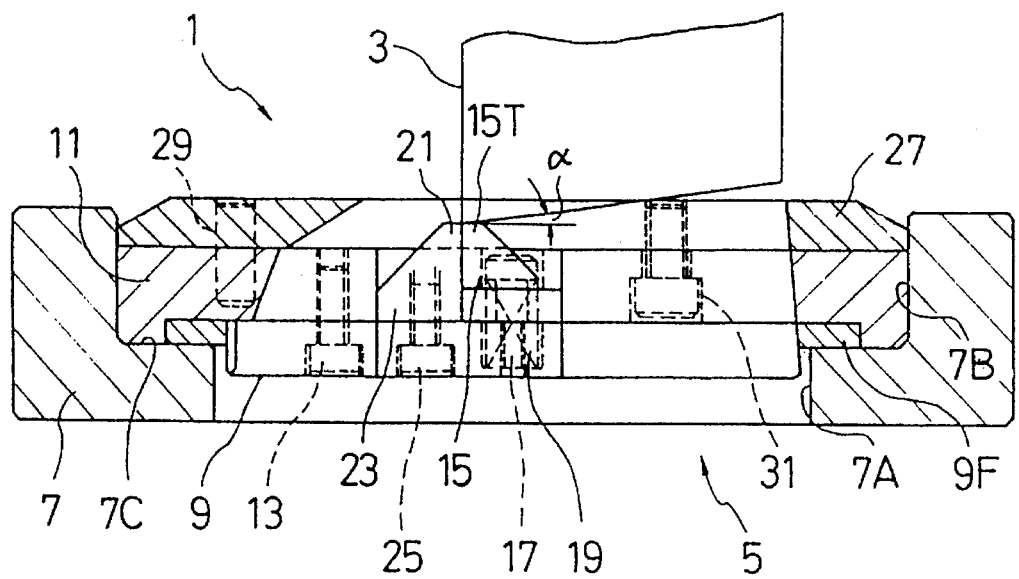
FIG. 1 is a front cross-sectional view showing the follow-up slotting tool according to the present invention.
Figure 2:
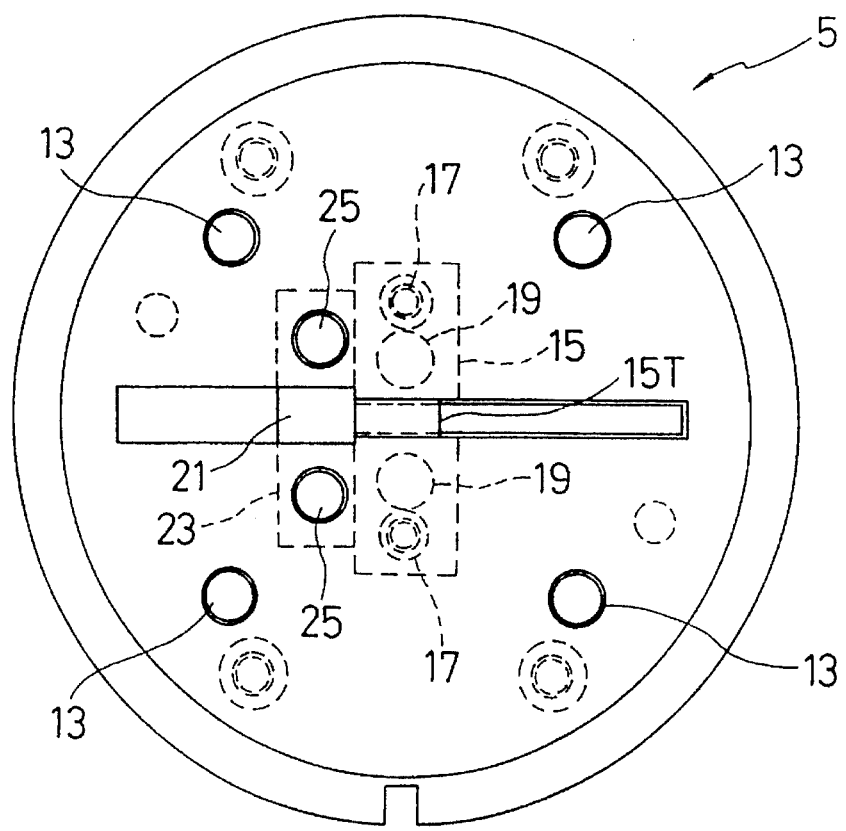
FIG. 2 is a plane view showing the same follow-up slotting tool shown in FIG. 1, in which a die holder is removed.
Figure 3:
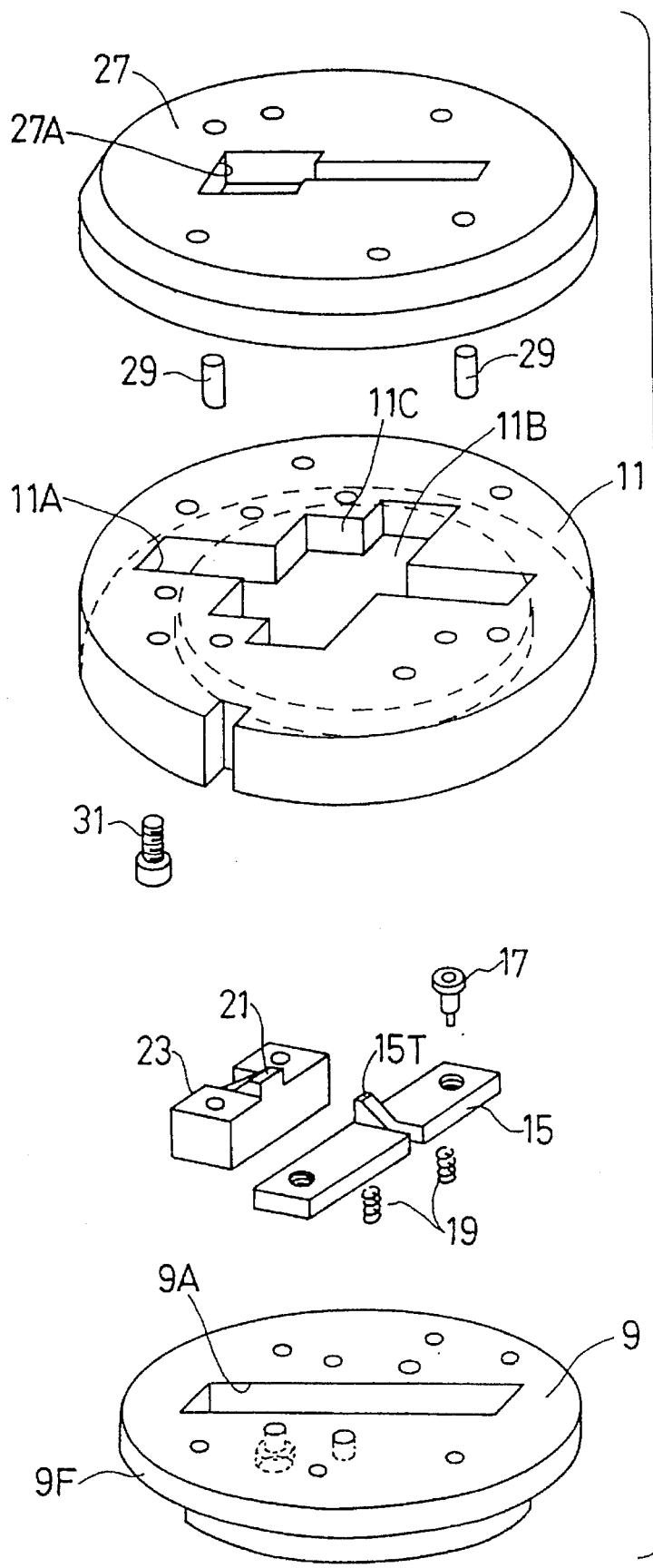
FIG. 3 is an exploded view showing the follow-up slotting tool according to the present invention, in which a lower die plate, an upper die plate and a die are shown separately.

With reference to FIGS. 1 to 3, the follow-up slotting tool 1 is roughly composed of a punch 3 movable up and down and a die unit 5. The punch 3 can be moved up and down at any predetermined stroke by a well known device such as a hydraulic cylinder, for instance. Further, the punch 3 is formed with a shear angle ($\alpha$) at the lower end surface thereof in such a way that the rear end side (the right side in FIG. 1) of the punch does not reach a workpiece located beneath the punch 3 when the punch 3 is lowered by a predetermined stroke.

The die unit 5 is provided with a die holder 7. The die holder 7 is formed with a first hole 7A and a second hole 7B whose diameter is larger than that of the first hole 7A. A circular lower die plate 9 is fitted to the first hole 7A of the die holder 7. Further, a flange 9F of the lower die plate 9 is mounted on a stepped portion 7C of the die holder 7. Further, the lower die plate 9 is formed with a rectangular opening 9A extending in the right and left direction in FIGS. 1 and 3 at roughly the central portion of the lower die plate 9.

A circular upper die plate 11 is fitted to the second hole 7B of the die holder 7 and fixedly mounted on the lower die plate 9 with a plurality of bolts 13. Further, the upper die plate 11 is formed with a rectangular opening 11A which corresponds to the rectangular opening 9A formed in the lower die plate 9. The rectangular opening 11A is connected to two other rectangular openings 11B and 11C formed at the central portion of the upper die plate 11 (see FIG. 3) so as to extend in a direction perpendicular to the right and left direction in FIG. 1.

A counter member 15 is mounted at roughly the central portion of the lower die plate 9 with a plurality of bolts 17. The counter member 15 is received in the rectangular opening 11B formed In the upper die plate 11 in such a way that a projecting portion 15T formed at the central portion of the counter member 15 can project from the upper surface of the upper die plate 11. Further, a plurality of springs 19 are interposed between the counter member 15 and the lower die plate 9 in such a way that the counter member 15 can be urged in an upward direction by the urging forces of these springs 19.

On the left side of the counter member 15 mounted on the lower die plate 9, a cutting edge block 23 is mounted on the lower die plate 9 with a plurality of bolts 25. The cutting edge block 23 is formed with a cutting edge 21 projecting upward from the middle portion thereof. The cutting edge block 23 is fixedly fitted to the rectangular opening 11C formed in the upper die plate 11. This cutting edge 21 cuts away the workpiece (the residue) in cooperation with the front end of the punch 3.

On the above-mentioned upper die plate 11, the circular die plate 27 is fixed with a plurality of bolts 31, after being located with the use a plurality of pins 29. The die plate 27 is formed with an opening 27A which corresponds in position to both the rectangular opening 11A formed in the upper die plate 11 and the rectangular opening 9A formed In the lower die plate 9.

The operation of the follow-up slotting tool 1 constructed as described above will be described hereinbelow with reference to FIGS. 4A and 4B and FIGS. 5A and 5B.

Figure 4A:
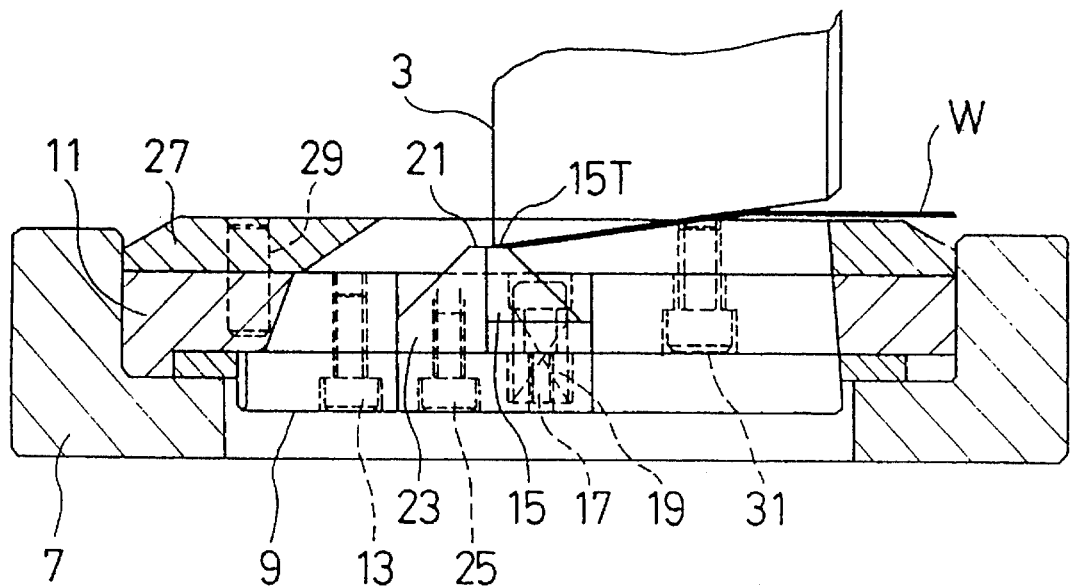
FIGS. 4A and 4B are cross-sectional views for assistance in explaining the cutting operation of the follow-up slotting tool according to the present invention.

First, as shown in FIG. 4A, an end surface of workpiece (a plate material) W is set near the central portion of the die plate 27, and then the punch 3 is lowered to punch the workpiece W, so that the workpiece (i.e., a residue $W_A$) is partially cut away from the workpiece into a channel- or U-shape. At this partial punching processing, the downward stroke of the punch 3 is to such an extent that the front end side (the left side in FIG. 4A) of the punch 3 is cut into the workpiece W but the rear end side (the right side in FIG. 4A) thereof is not cut into the workpiece W, when the punch 3 is lowered to its lowermost position.

Figure 4B:
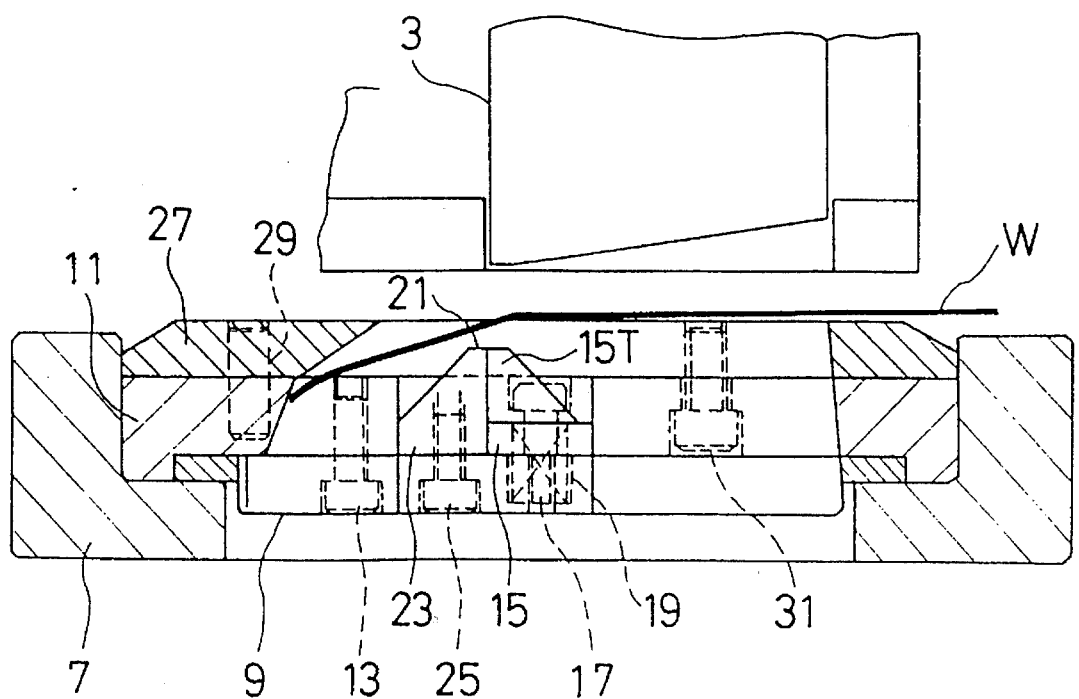

As shown in FIG. 4B, after the punch 3 has been returned to its uppermost position, the workpiece W is fed in the leftward direction by a predetermined pitch which is less than the already partially cut away U-shaped workpiece length.

Figure 5A:
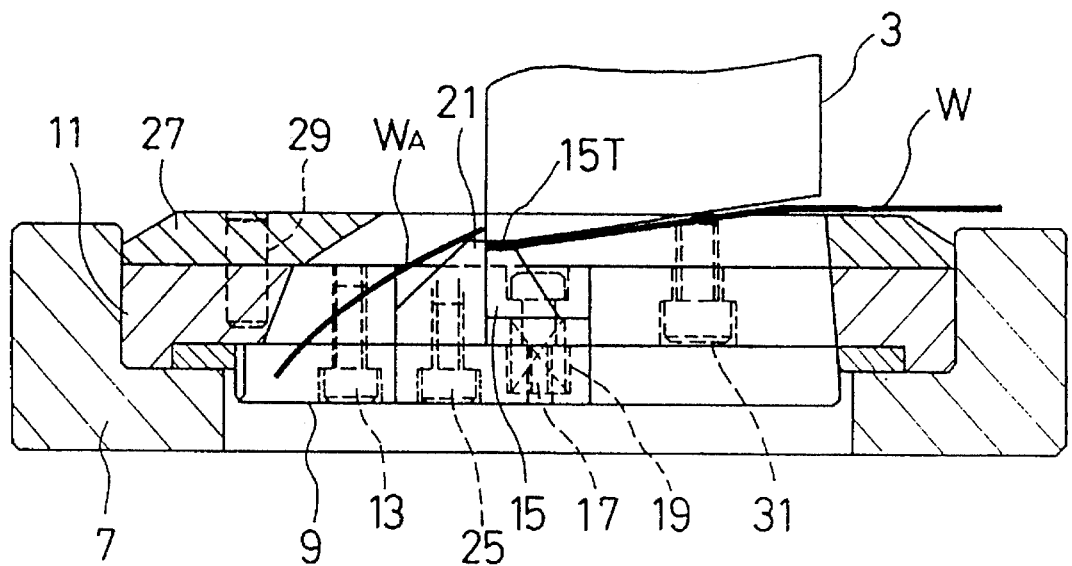
FIGS. 5A and 5B are similar cross-sectional views for assistance in explaining the cutting operation of the follow-up slotting tool according to the present invention.

As shown in FIG. 5A, under the condition that the workpiece W is fed in the leftward direction, the punch 3 is lowered again by the same stroke as shown in FIG. 4A to completely cut the partially cut away residue $W_A$ away from the workpiece W by both the cutting edge 21 of the cutting block 23 and the front end surface of the punch 3. At this moment the projecting portion 15T of the counter member 15 is lowered against the urging force of the springs 19. However, after the residue $W_A$ has been cut off, the counter member 15 is returned to the original upper position to lift up the front end of the workpiece W again.

Figure 5B:
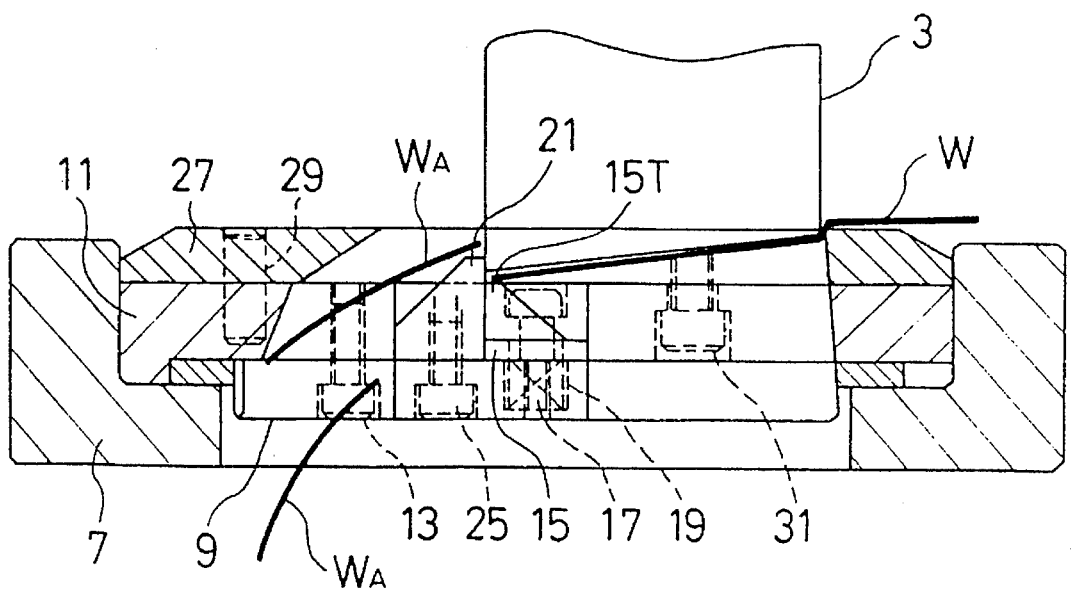

The above-mentioned operation as explained with reference to FIGS. 4A and 4B and FIG. 5A is repeated continuously to cut off a plurality of the residues (the cut-off parts) $W_A$, until the workpiece W is fed to a final feeding position (the cutting length). At the final cut-off processing, as shown in FIG. 5B, the punch 3 is lowered to such an extent that the rear end side (the right side in FIG. 5B) of the punch 3 is cut into the workpiece W to cut off the final residue $W_A$ from the workpiece W. Further, in the case where the press stroke is fixed and therefore not adjustable, the above-mentioned operation can be achieved by previously forming an opening at the start and end positions of the workpiece W, respectively.

As described above, in the follow-up slotting tool according to the present invention, it is possible to continuously and repeatedly cut off the workpiece W, by feeding workpiece at a predetermined pitch less than the already partially cut away workpiece length, without forming any stepped portions at the junction portions of the workpiece, in spite of a relatively large pitch of the follow-up cutting processing of workpiece W.

What is claimed is:

1. A follow-up slotting tool for continuously punching a workpiece fed at a predetermined pitch, comprising;

a punch having a lower end surface, a front end, and a rear end and having a shear angle at the lower end surface thereof in such a way that the from end of the punch cut the workpiece but the rear end thereof does not reach the workpiece when lowered at a predetermined downward stroke; and a die unit associated with said punch for punching the workpiece, said die unit having a counter member for raising a residue partially cut away from the workpiece after the punch has been lowered at the predetermined downward stroke, and a cutting edge cooperating with the front end of said punch for cutting off the partially cut away residue raised by the counter member when the punch is lowered at the succeeding predetermined downward stroke after said workpiece is fed at said predetermined pitch.

2. A follow-up slotting tool for continuously punching a workpiece fed at a predetermined pitch, which comprises:

a punch having a front end and a rear end and formed with a shear angle at an end surface thereof in such a way that the front end of the punch cuts the workpiece but the rear end thereof does not reach the workpiece when lowered at a first predetermined downward stroke; and a die unit having:

a lower die plate formed with a die opening;

an upper die plate arranged on said lower die plate and formed with a rectangular opening corresponding to the die opening and with first and second openings both extending perpendicular to the rectangular opening;

a counter member received in the first opening of said upper die plate, for raising a residue partially cut away from the workpiece, after said punch has been lowered at said first predetermined downward stroke; and a cutting edge received in the second opening of said upper die plate, for cutting off the partially cut away residue raised by said counter member in cooperation with said punch, when said punch is lowered at the succeeding predetermined downward stroke after said workpiece is fed at said predetermined pitch.

3. The follow-up slotting tool of claim 2, which further comprises at least one spring for urging said counter member to false the partially cut away residue so that the residue can be cut off from the workpiece at the succeeding predetermined downward stroke.

4. The follow-up slotting tool of claim 2, wherein said counter member and said cutting edge are secured to said lower die plate.

5. The follow-up slotting tool of claim 2, wherein after said workpiece is fed at said predetermined pitch, when said punch is lowered at a second predetermined downward stroke greater than said first predetermined downward stroke, the final partially cut away residue is cut off from the workpiece by the rear end of said punch to complete a slot in the workpiece in a continuous punching processing.

6. The follow-up slotting tool of claim 2, wherein said predetermined pitch is less than the length of said partially cut away workpiece.

* * * * *